(12) United States Patent
Mirkin et al.

(10) Patent No.: US 8,735,174 B2
(45) Date of Patent: May 27, 2014

(54) COATED COLLOIDAL MATERIALS

(75) Inventors: Chad A. Mirkin, Wilmette, IL (US);
Xiaodong Chen, Singapore (SG); Can Xue, Singapore (SG); Sarah J. Hurst, Chicago, IL (US)

(73) Assignee: Northwestern University, Evanston, IL (US)

( * ) Notice: Subject to any disclaimer, the term of this patent is extended or adjusted under 35 U.S.C. 154(b) by 837 days.

(21) Appl. No.: 12/670,194

(22) PCT Filed: Jul. 23, 2008

(86) PCT No.: PCT/US2008/070839
§ 371 (c)(1),
(2), (4) Date: Jun. 29, 2010

(87) PCT Pub. No.: WO2009/025954
PCT Pub. Date: Feb. 26, 2009

(65) Prior Publication Data
US 2010/0291697 A1 Nov. 18, 2010

Related U.S. Application Data

(60) Provisional application No. 60/951,620, filed on Jul. 24, 2007.

(51) Int. Cl.
| | |
|---|---|
| *G01N 33/551* | (2006.01) |
| *C09C 1/62* | (2006.01) |
| *C09C 3/06* | (2006.01) |
| *C01G 5/00* | (2006.01) |
| *A61K 47/00* | (2006.01) |

(52) U.S. Cl.
USPC ............ 436/525; 436/527; 106/404; 516/97

(58) Field of Classification Search
USPC ............ 516/97; 436/525, 527; 106/403, 404; 977/777, 904, 920
See application file for complete search history.

(56) References Cited

U.S. PATENT DOCUMENTS

| | | | |
|---|---|---|---|
| 4,177,253 | A | 12/1979 | Davies et al. |
| 4,672,040 | A | 6/1987 | Josephson |
| 5,104,791 | A | 4/1992 | Abbott et al. |

(Continued)

FOREIGN PATENT DOCUMENTS

| | | |
|---|---|---|
| EP | 0491622 | 6/1992 |
| EP | 1804053 | 7/2007 |

(Continued)

OTHER PUBLICATIONS

Mulvaney, P. et al. "Silica encapsulation of quantum dots and metal clusters." Journal of Materials Chemistry (2000) 10 1259-1270.*

(Continued)

*Primary Examiner* — Daniel S Metzmaier
(74) *Attorney, Agent, or Firm* — Marshall, Gerstein & Borun LLP

(57) ABSTRACT

Coated colloidal materials, methods for making coated colloidal materials, and methods of using coated colloidal materials are disclosed. The method yields coated colloidal materials where the optical characteristics of the core is not adversely affected. The coated colloidal materials can be self-assembled into films, layers, or structures and used in the detection of analytes through detection assays.

7 Claims, 2 Drawing Sheets

(56) References Cited

U.S. PATENT DOCUMENTS

| | | | |
|---|---|---|---|
| 5,512,439 A | 4/1996 | Hornes et al. | |
| 5,635,602 A | 6/1997 | Cantor et al. | |
| 5,665,539 A | 9/1997 | Sano et al. | |
| 5,990,479 A * | 11/1999 | Weiss et al. | 850/56 |
| 6,268,222 B1 | 7/2001 | Chandler et al. | |
| 6,750,016 B2 | 6/2004 | Mirkin et al. | |
| 6,974,669 B2 | 12/2005 | Mirkin et al. | |
| 7,291,284 B2 * | 11/2007 | Mirkin et al. | 216/41 |
| 7,323,309 B2 | 1/2008 | Mirkin et al. | |
| 7,776,130 B2 * | 8/2010 | Mirkin et al. | 75/345 |
| 7,824,467 B2 * | 11/2010 | Mirkin et al. | 75/371 |
| 7,985,539 B2 * | 7/2011 | Mirkin et al. | 435/6.1 |
| 8,092,595 B1 * | 1/2012 | Fan et al. | 117/70 |
| 2001/0031469 A1 | 10/2001 | Volinia | |
| 2002/0146745 A1 | 10/2002 | Natan et al. | |
| 2004/0209376 A1 | 10/2004 | Natan et al. | |
| 2005/0281884 A1 * | 12/2005 | Adair et al. | 424/489 |
| 2006/0207388 A1 * | 9/2006 | Mirkin et al. | 75/371 |
| 2006/0286684 A1 * | 12/2006 | Brennan et al. | 436/525 |
| 2008/0206562 A1 * | 8/2008 | Stucky et al. | 428/403 |
| 2009/0061006 A1 * | 3/2009 | Leuschner et al. | 424/491 |

FOREIGN PATENT DOCUMENTS

| | | |
|---|---|---|
| WO | WO 01/00876 A1 * | 1/2001 |
| WO | WO-2005/003394 A2 | 1/2005 |
| WO | WO 2005/049711 A2 * | 6/2005 |
| WO | WO-2006/138145 | 12/2006 |

OTHER PUBLICATIONS

Kobayashi et al, "Silica-coating of AgI semiconductor particles", Colloids and surfaces A: Physicochem. Eng. Aspects 251 (2004) pp. 197-201.*

Xu et al, "A novel approach to Au@SiO2 core-shell spheres", Journal of Non-Crystalline Solids 353 (2007) pp. 1212-1215.*

Li et al, "Preparation of Ag/SiO2 Nanosize Composites by a Reverse Micelle and Sol-Gel Technique", Langmuir, vol. 15, Iss. 13, pp. 4328-4334 (Jun. 22, 1999).*

Mirkin et al, "Colloidal Gold and Silver Trianglar Nanoprisms", Small, vol. 5, Iss. 6, pp. 646-664 (Mar. 20, 2009).*

Stuart et al, "Biological applications of localized surface plasmonic phenomenae", IEE Procedings Nanobiotechnology, Col. 152, Iss. 1, pp. 13-32 (Feb. 2005).*

Haes et al., "A Nanoscale Optical Biosensor: Sensitivity and Selectivity of AN Approach Based on the Localllized Surface Plasmon Resonance Spectroscopy of Triangular Nanoparticles", JACS, 2002, 124, pp. 10596-10604 (Web publ. Aug. 8, 2002).*

Aslan et al., Fluorescent core-shell Ag@SiO2 nanocomposites for metal-enhanced fluorescence and single nanoparticle sensing platforms, *J. Am. Chem. Soc.*, 129:1524-5 (2007).

Butler, Enzyme-linked immunosorbent assay, *J. Immunoassay*, 21:165-209 (2000).

Herbrink et al., "Introduction to enzyme linked immunosorbent assay" IN: HERBRINK (vol. ed.), *Techniques in Diagnostic Pathology*, vol. 2, Academic Press (1991).

International Preliminary Report on Patentability for corresponding International Application No. PCT/US2008/070839, dated Jan. 26, 2010.

International Search Report and Written Opinion for corresponding International Application No. PCT/US2008/070839, dated Oct. 27, 2009.

Kobayashi et al., Silica coating of silver nanoparticles using a modified Stober method, *J. Colloid Interface Sci.*, 283:392-6 (2005).

Kobayashi et al., Sol-gel processing of silica-coated gold nanoparticles, *Langmuir*, 17:6375-9 (2001).

Liz-Marzan et al., Synthesis of nanosized gold-silica-core-shell particles, *Langmuir*, 12:4329-35 (1996).

Tkachenko et al., Cellular trajectories of peptide-modified gold particle complexes: comparison of nuclear localization signals and peptide transduction domains,*Bioconjug. Chem.*, 15:482-90 (2004).

Tkachenko et al., Multifunctional gold nanoparticle-peptide complexes for nuclear targeting, *J. Am. Chem. Soc.*, 125:4700-1 (2003).

Ung et al., Controlled method for silica coating of silver colloids. Influence of coating on the rate of chemical reactions, *Langmuir*, 14:3740-8 (1998).

Xue et al., Self-assembled monolayer mediated silica coating of silver triangular nanoprisms, *Advanced Materials*, 19:4071-4 (2007).

* cited by examiner

SEQUENCE LISTING

```
<160> NUMBER OF SEQ ID NOS: 3

<210> SEQ ID NO 1
<211> LENGTH: 25
<212> TYPE: DNA
<213> ORGANISM: Artificial Sequence
<220> FEATURE:
<223> OTHER INFORMATION: Synthetic Nucleotide
<220> FEATURE:
<221> NAME/KEY: modified_base
<222> LOCATION: (25)..(25)
<223> OTHER INFORMATION: Position 25 is modified as a thiol base.

<400> SEQUENCE: 1
atttaacaat aatccaaaaa aaaaa                                            25

<210> SEQ ID NO 2
<211> LENGTH: 22
<212> TYPE: DNA
<213> ORGANISM: Artificial Sequence
<220> FEATURE:
<223> OTHER INFORMATION: Synthetic Nucleotide
<220> FEATURE:
<221> NAME/KEY: modified_base
<222> LOCATION: (1)..(1)
<223> OTHER INFORMATION: Position 1 is modified as a thiol base.

<400> SEQUENCE: 2
aaaaaaaaaa atccttatca at                                               22

<210> SEQ ID NO 3
<211> LENGTH: 27
<212> TYPE: DNA
<213> ORGANISM: Artificial Sequence
```

```
<220> FEATURE:
<223> OTHER INFORMATION: Synthetic Nucleotide

<400> SEQUENCE: 3
cgattattgt taaatattga taaggat                                              27
```

COATED COLLOIDAL MATERIALS

CROSS-REFERENCE TO RELATED APPLICATIONS

This application claims priority to U.S. Provisional Application No. 60/951,620, filed Jul. 24, 2007, which is incorporated herein by reference in its entirety.

STATEMENT OF GOVERNMENTAL INTEREST

This invention was made with government support under Office of Naval Research grant no. N00014-06-1-0079 and National Science Foundation grant no. DMR-0520513. The government has certain rights in the invention.

BACKGROUND OF THE INVENTION

1. Field of the Disclosure

The disclosure is generally related to coated colloidal materials, and more specifically is related to silica-coated transition metal nanocrystals, such as silica-coated silver or gold nanoprisms.

2. Brief Description of Related Technology

Metal nanoparticles have attracted a great deal of attention during the past decades due to their potential applications in the fields of catalysis, optics, and biosensing. Gold and silver nanostructures are of particular interest due to their unusual optical properties that are dependent on size and shape. Triangular silver nanoprisms, in particular, exhibit highly tunable architecture-dependent optical properties. These structures also have very high surface energies, especially at their tips and edges, where the silver atoms can be readily oxidized. Unfortunately, this oxidation causes either truncation of the tips of the prisms or their complete dissolution and is accompanied by a concomitant shift in or a complete loss-of-their surface plasmon resonance (SPR) bands. Consequently, methods have been investigated in the attempt to protect nanoparticles from oxidation.

One method that has been attempted to protect nanoparticles from oxidation is encasing the nanoparticles in silica shells. These shells are useful because they 1) are transparent in the visible and IR regions of the spectrum, 2) are chemically inert in a wide variety of solvents, and 3) can be functionalized using well-developed silane coupling chemistry. Therefore core-shell nanostructures would typically maintain the optical signatures of the metal cores, while gaining the desirable chemical and physical properties of the silica shells.

The Stöber method recently has been adapted for coating metal nanocrystals with silica shells. See e.g. Alsan et al. *J. Am. Chem. Soc.* 129:1524 (2007). This sol-gel process typically involves ammonia-catalyzed hydrolysis and condensation of molecules, such as tetraethoxysilane. However, directly applying this method to coat silver nanoparticles poses challenges because etching and aggregation of silver nanoparticles are induced by ammonia.

To solve this problem, Kobayashi et al. have used dimethylamine (DMA) (at concentrations between 0.4 and 0.8 M) to catalyze silica shell growth on silver nanoparticles. See Kobayashi et al. *J. Colloid Interf. Sci.* 282:392 (2005). Using DMA as opposed to ammonia, the researchers showed that silica shells could be easily formed without decreasing the diameter of the silver nanoparticle core. However, Kobayashi's method cannot be applied to silver nanoprisms because significant etching and aggregation of the nanoprisms occur even in a 0.4 M solution of DMA.

Therefore, a need exists for the preparation of coated nanoparticles where the size and shape of the nanoparticle is maintained through the coating process.

SUMMARY OF THE INVENTION

Disclosed herein are coated colloidal materials, methods for making coated colloidal materials, and methods of using coated colloidal materials.

Thus, in one embodiment are disclosed coated colloidal materials comprising (a) a colloidal material having a passivated surface and (b) a coating comprising at least one of a silica or a titania on the passivated surface. In another embodiment are disclosed coated colloidal material prepared by a method comprising admixing a colloidal material, a surface passivating agent, and a coating agent in the presence of an optional catalyst.

The colloidal material can be a nanocrystal, or more specifically a nanoprism. In some cases, the colloidal material comprises a transition metal, such as gold or silver.

In various cases, the surface passivating agent has at least one functional group selected from the group of consisting of a halo, an alkoxy, a carboxylic acid, an ester, a thiol, a selenide, an amine, an amide, a phosphate, a phosphite, a phosphonate, an alkene, an alkyne, a silane, a siloxane, a borane, and mixtures thereof. In some cases, the surface passivating agent comprises a thiol. The thiol can further comprise a second functional group. The second functional group can be a halo, an alkoxy, a carboxylic acid, an ester, a thiol, a selenide, an amine, an amide, a phosphate, a phosphite, a phosphonate, an alkene, an alkyne, a silane, a siloxane, or a borane. In one specific case, the surface passivating agent is 16-mercaptohexadecanoic acid.

The coating agent can be a silica, a titania, or mixtures thereof. The silica can be from a silane, such as an alkoxysilane. In some cases, the silane is tetraethoxysilane. The titania can be from a titanium alkoxide.

The optional catalyst can be an amine. In some embodiments, the amine is an alkylamine, an arylamine, or mixtures thereof. In some cases, the amine is dimethyl amine.

The coated materials disclosed herein can further comprise a functionalizing agent on the coating. The functionalizing agent can have at least one functional group selected from a halo, an alkoxy, a carboxylic acid, an ester, a thiol, a selenide, an amine, an amide, a phosphate, a phosphite, a phosphonate, an alkene, an alkyne, a silane, a siloxane, a borane, or a mixture thereof. In various cases, the functionalizing agent can be decyl(trimethoxy)silane, decyl(triethoxy)silane, dodecyl(triethoxy)silane, hexadecyl(trimethoxy)silane, octadecyl(trimethoxy)silane, or mixtures thereof. In some embodiments, the functionalizing agent comprises a second functional group. In such cases, the second functional group can be the same or different from the first functional group. A specific functionalizing agent having a second functional group is 3-aminopropyl (trimethoxy) silane. Other functionalizing agents contemplated include biomaterials, such as oligonucleotides, polypeptides, proteins, antibodies, peptides, anticancer agents, polynucleotide-binding agents, carbohydrates, lipids, cell-surface receptor-binding agents, and mixtures thereof.

In some embodiments, the coated colloidal materials disclosed herein can be formed into monolayer and can be deposited onto a substrate, such as a silica wafer, using a Langmuir Blodgett technique.

The disclosed coated colloidal materials can be used to detect analytes. The method comprises contacting the sample with a coated colloidal material as disclosed herein under conditions sufficient to permit an interaction of the analyte and the coated colloidal material, and detecting the interaction, wherein the interaction of the analyte and the coated colloidal material produces a detection event. The detection event can be any event that produces a measurable change. In cases where the coated colloidal material comprises an oligonucleotide functionalizing agent and the analyte is a complementary oligonucleotide or a oligonucleotide-binding agent, the detection event is a change in melting temperature.

The disclosed methods for preparing coated colloidal materials do not adversely affect the size, shape, or physical/chemical characteristics of the colloidal material. The prior art disclosed methods of preparing silica-coated colloidal materials, but those methods adversely affected the size, shape, and other characteristics of the colloidal materials through etching or other reactions. In accordance with the present invention, colloidal materials can be coated without detrimental or adverse affects to the colloidal material.

Additional features of the invention may become apparent to those skilled in the art from a review of the following detailed description, taken in conjunction with the drawings, the examples, and the appended claims.

BRIEF DESCRIPTION OF THE DRAWINGS

For a more complete understanding of the disclosure, reference should be made to the following detailed description and accompanying drawing wherein.

Figure 1:
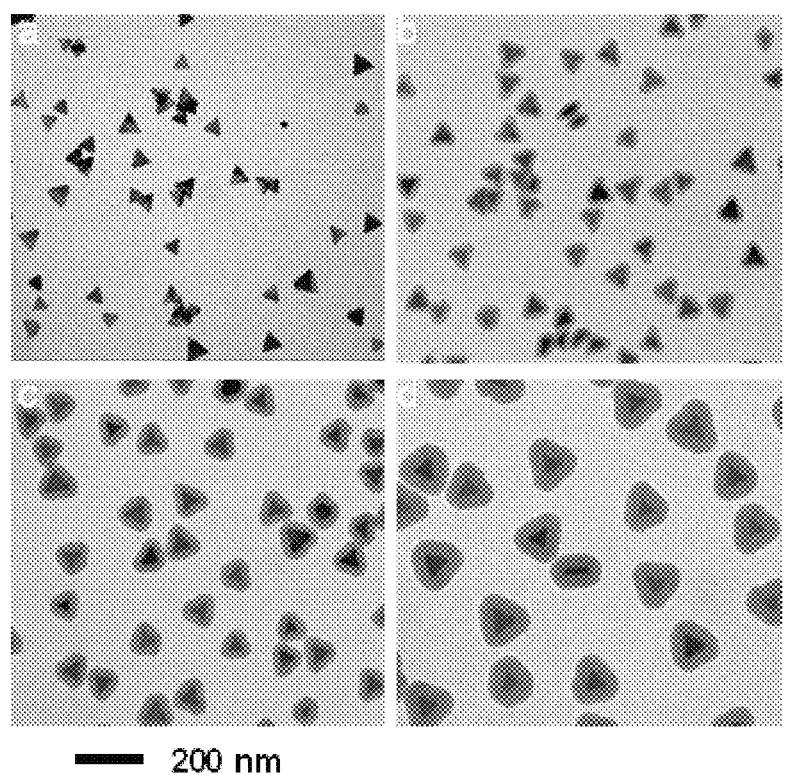
FIG. 1 shows a transmission electron micrograph of silver nanoprisms and silica-coated silver nanoprisms. The figure illustrates the variability in the thickness of the silica-coating.

While the disclosed comparative study includes embodiments in various foil is, it is not intended to limit the invention to the specific embodiments described and illustrated herein.

DETAILED DESCRIPTION OF THE INVENTION

Disclosed herein are coated colloidal materials. These coated colloidal materials generally include a crystalline colloidal material and a coating, e.g. silica or titania. In some embodiments, the crystalline colloidal material is a nanocrystal of a transition metal, for example silver or gold. The disclosed method of making the coated colloidal material is such that the colloidal material has the same morphology as the colloidal material prior to application of the coating. Consequently, nanocrystals of transition metals can be coated with a silica or a titania without detrimental effects on the shape, size, or physical/chemical characteristics, e.g., optical properties, of the nanocrystals. This method allows control of the physical and chemical characteristics of the nanocrystal without adversely affecting the other desirable properties of the nanocrystal.

Colloidal materials are dispersible discrete particles and can be crystalline. In some embodiments, the colloidal material can be silica or titania. In various embodiments, the colloidal material comprises crystalline transition metal colloids, and preferably are transition metal nanocrystals.

Modern methods of manufacturing nanocrystals yield nanocrystals with a wide variety of sizes and shapes. Preferably, crystalline colloidal materials have at least two dimensions (in an X, Y, Z coordinate axis) in the nanometer range but are not limited by shape. The shape of the crystalline colloidal material can be, for example, a rod, cube, truncated cube, cuboctahedra, truncated octahedra, octahedral, pyramid, prism, spheres and/or wire. Preferably, the crystalline colloidal material is a nanocrystal in the shape of a cube, truncated cube, octahedra, truncated octahedra or prism. Even more preferably, the nanocrystal is a prism. The colloidal material used herein is not limited by the dimensions of the nanocrystal.

All crystalline transition metal colloids amenable to the conditions necessary to form a coating are contemplated. In this context "a coating" is a material that is capable of covering at least a portion of a colloidal material. In some cases, the coating is a coating with or of silica, titania, or both. The coatings can include additional components or formulations, dependent for example on the purity of the materials used, the method of production, the inclusion of dopants or other elements, and/or the crystal form of the silica and/or titania.

Applicable crystalline colloidal materials include insulators, semiconductors, and conductors. Semiconductors can include p-type and n-type materials. Crystalline colloidal materials can further include doped insulators, doped semiconductors, and doped conductors. Moreover, crystalline colloidal materials can include transition metals, alkali metals, alkali earth metals, and main group elements. Crystalline colloidal materials can also include lanthanide and actinide elements. The transition metal colloids included herein are pure transition metal colloids, i.e., colloids that contain only a single transition metal, and/or transition metal alloys, wherein transition metal alloys have at least one transition metal and at least one additional element. Herein, transition metals specifically include group 8, 9, 10, 11, and 12 metals. More specifically, transition metals include iron, cobalt, nickel, copper, zinc, ruthenium, rhodium, palladium, silver, cadmium, iridium, platinum, and gold. Preferably, the transition metal comprises silver or gold.

As used herein, the colloidal material is passivated prior to or simultaneous to applying the coating. Typically, the colloidal material is passivated using a surface passivating agent. Non-limiting examples of surface passivating agents include those agents that can form monolayers, bilayers, and multilayers on the surface of the colloidal material. By way of illustration, a surface passivating agent can be an agent that forms a monolayer on the surface of the colloidal material by covalent, ionic, van der Waals, or other chemical or electrostatic interactions with the colloidal material. In one example, surface passivating agents form chemical bonds with the colloidal material. The surface passivating agent can include one or more functional groups, such as a halo, an alkoxy, a carboxylic acid, an ester, a thiol, an alkylselenide, an amine, an amide, a phosphate, a phosphite, a phosphonate, an alkene, an alkyne, a silane, a siloxane, and/or a borane functional group.

In one preferred embodiment, a surface passivating agent contains a thiol functional group. Non-limiting examples of surface passivating agents that contain thiol functionalities include organic thiols, e.g., linear alkanethiols, branched alkanethiols, cycloalkanethiols, arylalkanethiols, and arylthiols. Thiols can be described by either their chemical formula or their chemical name, for example, $C_8H_{17}SH$ and octanethiol are synonymous. Alkanethiols include chemicals with the generic formula of R—SH where R is an alkyl group having about 6 to about 24 carbon atoms.

In another embodiment, the surface passivating agent is a two component system that forms bilayers on the colloidal material. Bilayers can be formed, by way of example, by van der Waal, aromatic, ionic, and covalent interactions between chemicals. A bilayer surface passivated colloidal material can be made by mixing the colloidal material with a first surface passivating agent and a second surface passivating agent. The second surface passivating agent can be the same surface passivating agent or a different passivating agent. Moreover, multiple, chemically-distinct, second passivating agents can be added to the colloidal material. By way of a non-limiting example, a first surface passivating agent can be an alkanethiol, for example dodecanethiol, and a second surface passivating agent can be an alkanecarboxylic acid, for example dodecanoic acid. Without being bound by theory, a bilayer surface passivated colloidal material is formed when the dodecanethiol interacts with the colloidal material and the dodecanoic acid through hydrophobic or van der Waal interactions interacts with the linear alkyl functionality of dodecanethiol.

Preferably, the surface passivating agent is a single component system that contains a first functional group and a second functional group. More preferably, the two functional groups are chemically distinct. Non-limiting examples of surface passivating agents that contain two chemically distinct functional groups are those compounds that have a first thiol functional group, e.g. saturated or unsaturated alkanethiols, branched alkanethiols, cycloalkanethiols, arylalkanethiols, and arylthiols, and a second functional group that is not a thiol. Preferably, the saturated or unsaturated alkanethiols, branched alkanethiols, cycloalkanethiols, arylalkanethiols, and arylthiols have about 6 to about 24 carbon atoms. Non-limiting examples of passivating agents having two functional groups include compounds where the first functional group is a thiol and the second functional group is a halo, a hydroxyl, a carboxylic acid, an ester, a ketone, a selenide, an amine, an amide, a phosphate, a phosphite, a phosphonate, a silane, a siloxane, or a borane. One class of preferred passivating agents are thiol-carboxylic acids. One, non-limiting, example of a preferred thiol-carboxylic acid is 16-mercaptohexadecanoic acid. A second class of preferred surface passivating agents is thiol-siloxanes, for example those described in EP 0 491 622. One example of a preferred thiol-siloxane is 12-mercaptododecyl(triethoxy)silane.

Another aspect of the invention is mixing the colloidal material with a coating agent. As used herein, "coating agent" means a chemical precursor to a colloidal material coating. As used throughout, the coating agent precursor can be used interchangeably to refer to the coating itself, unless specified otherwise. In one embodiment, the coating agent is a silane, which is a silicon containing precursor to a silica coating. Thus, for example, when the coating is a silica, the coating agent is typically a silane precursor. Reference to the silane as the coating encompasses a reference to the silica as the actual coating. It can be understood by one skilled in the art that the coating agent can be mixed with the colloidal material before, after, or contemporaneously with the addition of the surface passivating agent.

In one preferred embodiment, the silane coating agent is an orthosilicate, e.g. an alkyl orthosilicate also called an alkyoxysilane. Tetraalkyl orthosilicates (also known as tetra (alkoxy)silanes) are specifically contemplated, wherein the alkyl (alkoxy) groups can be the same or different. Non-limiting examples of tetraalkyl orthosilicates include tetramethyl orthosilicate (also known as tetramethoxysilane), tetraethyl orthosilicate (TEOS, tetraethoxysilane), tetrapropyl orthosilicate, and tetrabutyl orthosilicate.

In another embodiment, the coating agent is an titania. "Titania" refers to any titanium containing precursor to an titania coating. It can be understood by one skilled in the art that the titania can be mixed with the colloidal material before, after, or contemporaneously with the addition of the surface passivating agent. In one preferred embodiment, the titiania can be an titanium alkoxide. Titanium alkoxides include titanium isopropoxide, titanium methoxide, and titanium ethoxide.

The coated colloidal materials can be prepared using an optional catalyst. Typically, the catalyst is a condensation catalyst. A condensation catalyst is an agent that facilitates the formation of the colloidal material coating. Silicate condensation catalysts include, but are not limited to, amines such as alkylamines or arylamines. Alkylamines include $C_{1-8}$alkylamines, $(C_{1-8}alkyl)_2$amines, and $(C_{1-8}alkyl)_3$amines. In one embodiment, the catalyst comprises dimethylamine. Additional silica condensation catalysts are familiar to one skilled in the art.

The optical properties of the coated colloidal materials disclosed herein are distinguishable from the optical properties of the non-coated colloidal material. Shifts in the optical spectra of colloidal materials were observed when the colloidal materials were mixed with surface passivating agents. Additionally shifts in the optical spectra of colloidal materials were observed when colloidal materials were coated. In one particular embodiment, the optical spectrum of a silver nanoprism red-shifted upon the addition of a surface passivating agent, moreover, the optical spectrum red-shifted upon the formation of the silica-coated silver nanoprism.

The thickness of the colloidal material coating can be any desired thickness, but is preferably about 1 nm to about 100 nm. Moreover, the thicknesses of the colloidal material coating can be about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 90 nm, about 95 nm, and about 100 nm. FIG. 1 illustrates some examples of silica-coated silver nanocrystals with silica-coating thicknesses of about 15, about 30, and about 45 nm.

In some embodiments, the coated colloidal materials further include a layer of a functionalizing agent that is on the coating. Without being bound by theory, it is proposed that the functionalizing agent binds to the coated colloidal material through ionic, covalent, and/or electrostatic interactions. In one preferred embodiment, the functionalizing agent contains at least one functionality that can chemically bond, ionically or covalently, to the surface of the coated colloidal material. Preferably, the functionality can be a carboxylic acid or a siloxane. Non-limiting examples of siloxane, functionalizing agents include alkyl(trialkoxy)silanes, and aryl (trialkoxy)silanes. Specific examples of alkyl(trialkoxy)silanes include siloxane functionalizing agents having the general chemical formal of $RSi(OR')_3$, wherein R has about 3 to about 24 carbon atoms and R' has about 1 to about 6 carbon atoms. Non-limiting, examples include decyl(triethoxy)silane, dodecyl(triethoxy)silane, hexadecyl(trimethoxy)silane, and octadecyl(trimethoxy)silane.

In various embodiments, the functionalizing agent can have more than one functional group. The functional groups can be the same or different. The first functional group preferably is a carboxylic acid or a siloxane. The second functional group is preferably a halo, alkoxy, ketone, ester, carboxylic acid, siloxane, amine, amide, phosphate, phosphite, or phosphonate. Examples of functionalizing agents having two different functionalities include, but are not limited to, mercaptoalkyl(trialkoxy)silanes, aminoalkyl(trialkoxy)silanes, mercaptoaryl(trialkoxy)silanes, aminoaryl(trialkoxy) silanes, and aminoalkanoic acids. Some specific examples of functionalizing agents include amino acids, aminoalkyl(trialkoxy)silanes wherein each alkyl or alkoxy group has about 1 to about 24 carbons, and mercaptoalkyl(trialkoxy)silanes, wherein each alkyl or alkoxy group has about 1 to about 24 carbons. One preferred functionalizing agent is 3-aminopropyl(trimethoxy)silane.

Yet another aspect of the invention is ordered colloidal materials. Ordered materials refer to self-assembled or organized layers and structures of coated colloidal materials. Self-assembled layers and structures are those layers and structures in which a disordered system of pre-existing components forms an organized structure or pattern as a consequence of specific, local interactions among the components themselves, without external direction. The interactions can be controlled by preselecting the functionalizing agent for desired chemical/physical properties. Moreover, the physical properties can be preselected to make the coated colloidal material adaptable to techniques that can be used to prepare layers and structures. For example, selecting octadecyl(trimethoxy)silane as a coating agent can yield an octadecyl-coated colloidal material that is soluble in non-polar solvents and is appreciably hydrophobic or is insoluble in water. Furthermore, the octadecyl-coated colloidal material can be deposited as a monolayer on a substrate by the Langmuir-Blodgett technique. As defined herein, the Langmuir-Blodgett technique is a method of depositing monolayers of a material on a substrate, such as a silicon wafer, that comprises forming a film of the material on a liquid surface that the material is insoluble in, and passing the substrate through the film and liquid surface. Additionally, the Langmuir-Blodgett technique can be used to form multilayers of a coated colloidal material, or of combinations of a colloidal materials, other materials, and/or materials amendable to the Langmuir-Blodgett technique, wherein the other material or materials can be coated colloidal material. Additional aspects of preparing and forming organized materials are readily available to one skilled in the art.

In still another embodiment, the functionalizing agent can be a biomaterial and the resulting functionalized colloidal material has an attached biomaterial. By way of example, polypeptides, polynucleotides, or other biomolecules can be attached directly to the coated colloidal material, to a functionalized-coated colloidal material, or to a functionalizing agent prior to making mixing with a colloidal material. See International Patent Publication No. WO/2006/138145, incorporated herein for its disclosure of oligonucleotide attachment to nanoparticles. As used herein, biomaterials refer to naturally-occurring and synthetic biomaterials and can be proteins, polypeptides, peptides, small molecules, carbohydrates, lipids, polynucleotides, and/or oligonucleotides.

Biomaterials are useful, in one aspect, for delivery of the functionalized colloidal material to specific cell types and/or organs, as well as sub-cellular locations. Accordingly, biomaterials include, without limitation, nuclear localization signals (NLS) and peptide transduction domains, including, for example, SV40 large T NLS, HIV-1 TAT protein NLS, adenovirus NLS, integrin binding domain, oligolysine (each of which is described in Tkachenko, et al., *Bioconjugate Chem.* (2004) 15:482-490), and adenovirus fiber protein comprising both NLS and receptor-mediated endocytosis (RME) domains (Tkachenko, et al., *J. Am. Chem. Soc.* (2003) 125: 4700-4701).

Oligonucleotides that can be attached to a coated colloidal material include those which, in one aspect, modulate expression of a gene product expressed from a target polynucleotide. See International Patent Publication No. WO/2006/138145, incorporated herein for its disclosure of oligonucleotides and oligonucleotide features. Accordingly, antisense oligonucleotides which hybridize to a target polynucleotide and inhibit translation, siRNA oligonucleotides which hybridize to a target polynucleotide and initiate an RNAse activity (for example RNAse H), triple helix forming oligonucleotides which hybridize to double-stranded polynucleotides and inhibit transcription, and ribozymes which hybridize to a target polynucleotide and inhibit translation, can be attached to the coated-colloidal material.

The coated-colloidal material functionalized with a biomaterial can be employed in therapeutic and/or diagnostic applications. Applications include screening and identification of therapeutics and/or antisense oligonucleotides; diagnostic screening, detection assaying, and formation of triplex DNA.

In still another aspect of the invention, the coated colloidal material can be used in detection assays, such as the bio barcode assay. See U.S. Pat. Nos. 7,323,309; 6,974,669; 6,750,016; 6,268,222; 5,512,439; 5,104,791; 4,672,040; and 4,177,253; U.S. Publication Nos. 2001/0031469; 2002/0146745; and 2004/0209376; and International Patent Publication No. WO 05/003394, each of which is incorporated herein by reference in its entirety. Non-limiting examples of detection assays include immuno-PCR assays; enzyme-linked immunosorbent assays, Western blotting, indirect fluorescent antibody tests, change in solubility, change in absorbance, change in conductivity; and change in Raman or IR spectroscopy. (See e.g., Butler, *J. Immunoassay,* 21(2 & 3):165-209 (2000); Herbrink, et al., *Tech. Diagn. Pathol.* 2:1-19 (1992); and U.S. Pat. Nos. 5,635,602 and 5,665,539, each of which is incorporated herein by reference).

Figure 2:
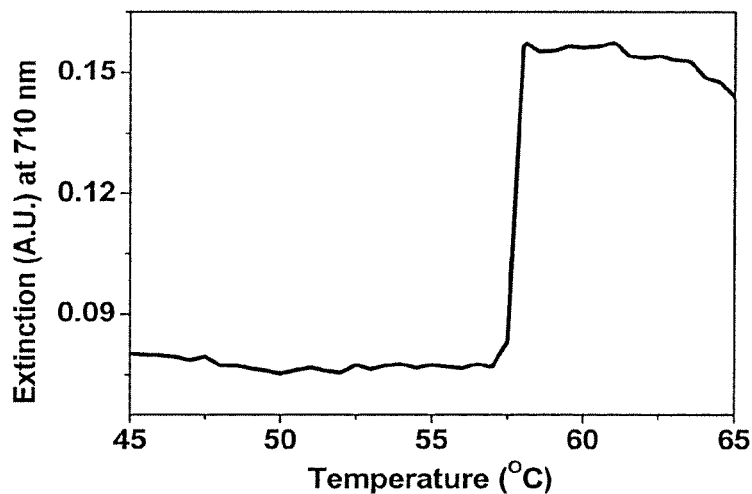
FIG. 2 shows a thermal denaturation curve, monitored at 710 nm, of an analyte/DNA-functionalized, silica-coated colloidal material.
Figure 3:
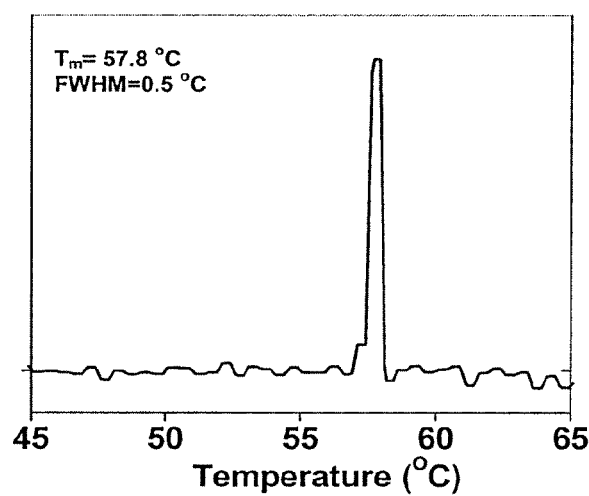
FIG. 3 shows the first derivative of the melting transition, illustrating the sharp cooperative-melting transition.

In one aspect, a detection assay involves an interaction between an analyte, or target, in a sample and the coated colloidal material that produces a change that can be detected, i.e., a detection event. The detection event can be a change in fluorescence, absorbance, Raman scattering, electrical properties, light scattering, solubility, melting point, cooperative melting transition, or other physical or chemical properties of the analyte and/or the functionalized coated colloidal material that can be detected by means available to one of skill in the art. For example, see FIG. 2 and FIG. 3 showing an absorbance detection event corresponding to a cooperative melting transition. Often the detection event is indicative of an interaction, for example a pairing or binding, of the analyte and the functionalized coated colloidal material. Correspondingly, known detection events will provide methods for assaying the structure and composition of analytes.

EXAMPLES

The following examples are provided to illustrate the invention, but are not intended to limit the scope thereof. Silica-coated silver nanoprisms were prepared by adding one milliliter (mL) of a 50 millimolar (mM) sodium borohydride solution in water to a cold water solution prepared by mixing 0.5 mL of a 20 mM silver nitrate solution with one mL of a 30 mM sodium citrate solution in 95 mL of water. Every two minutes for the course of fifteen minutes, 5-6 drops of the a 50 mM sodium borohydride solution was added to the solution. Then one mL of the sodium borohydride solution and one mL of a five mM bis(p-sulphonatophenyl)phenyl-phosphine dehydrate dipotassium solution were added dropwise. The resulting solution was stirred for five hours, then left undisturbed for twelve hours at 4° C. The pH of the solution was adjusted to 11 and the solution was irradiated with a 150-watt halogen lamp coupled with an optical bandpass filter (center wavelength at 550±20 nm) for 4 hours. Solids were collected by centrifugation then redispersed in a 0.3 mM sodium citrate solution. To the sodium citrate solution was added 16-mercaptohexadecanoic acid in ethanol until the concentration of 16-mercaptohexadecanoic acid reached 20 µM. Solids were then collected by centrifugation and suspended in a solution of tetraethoxysilane and ethanol. By varying the tetraethoxysilane concentration (for example from 0.5 mM to 0.75 mM to 1 mM), then adding an aqueous solution of dimethylamine (20 wt. %) to a final concentration of 0.6 M, silica-coated silver nanoprisms with varying silica-coating thicknesses were obtained. See FIG. 1.

Functionalized Silica-Coated Silver Nanoprisms.

The silica-coated silver nanoprisms were then functionalized with octadecyl(trimethoxy)silane by adding a 10 mM solution of octadecyl(trimethoxy)silane in ethanol to the silica-coated silver nanoprisms until a final concentration of 0.5 mM of octadecyl(trimethoxy)silane was achieved.

These functionalized, silica-coated silver nanoprisms were then deposited on a silicon wafer as an organized monolayer by the Langmuir-Blodgett technique. The functionalized, silica-coated silver nanoprisms were dispersed in a solution containing 0.01 milligrams/mL of polyvinylpyrrolidone (MW~55,000) in chloroform. This dispersion was then added to an aqueous solution of polyvinylpyrrolidone (3.5 mg/L). The chloroform was evaporated, the remaining nanoprisms were compressed, and a silicon wafer was dragged through the nanoprisms to yield a monolayer of the functionalized silica-coated silver nanoprisms on the silicon wafer.

Alternatively, the silica-coated silver nanoprisms were then functionalized with 3-aminopropyltrimethoxysilane by adding 2 wt % 3-aminopropyltrimethoxysilane to the nanoprisms. These prisms were sequentially washed with ethanol twice and then anhydrous dimethyl sulfoxide (DMSO) twice before being resuspended in a succinimidyl 4-[p-maleimidophenyl] butyrate (SMPB)/DMSO solution (1 mL, 10 mM). The suspension was then washed with anhydrous DMSO (1 mL) three times and twice with a coupling buffer (0.1 M sodium phosphate buffer, 0.2 M NaCl, pH 7.0).

The 3-aminopropyltrimethoxysilane functionalized silica-coated silver nanoprisms were divided and separately treated with 10 µM solutions of a DNA fragment with the formulation 3' SH-A10-CCT AAT AAC AAT TTA (SEQ ID NO: 1) and a DNA fragment with the formulation 5' SH-A10-ATC CTT ATC AAT (SEQ ID NO: 2). These DNA functionalized nanoprisms were then washed a mixture of 0.15 M sodium phosphate buffer and 0.15 M NaCl at pH 8.0. Finally, the DNA functionalized nanoprisms were suspended in sulfo-NHS acetate (1 mL, 10 mM) washed with and then suspended in a solution of 10 mM sodium phosphate buffer and 0.2 M NaCl at pH 7.4. The DNA functionalized nanoprisms were then mixed together with a complimentary oligonucleotide in a 1:1 ratio, where 10 pmol of 5'CGA TTA TTG TTA AAT ATT GAT AAG GAT 3' (SEQ ID NO: 3) was added yielding linked-hybridized nanoprisms. (Complimentary oligonucleotides are those oligonucleotides having sufficient nucleic acid-base paring with the oligonucleotide attached to the functionalized colloidal material to form a paring applicable in a detection assay.) The linked-hybridized nanoprisms have a sharp cooperative melting transition that is applicable in a detection assay. See FIG. 2 and FIG. 3.

The foregoing description is given for clearness of understanding only, and no unnecessary limitations should be understood therefrom, as modifications within the scope of the invention may be apparent to those having ordinary skill in the art.

---

What is claimed:

1. A coated colloidal material comprising (a) a colloidal material having a passivated surface; (b) a coating comprising at least one of a silicate or a titania on the passivated surface; and (c) a functionalizing agent on the coating, wherein the colloidal material comprises a nanoprism and the functionalizing agent is selected from the group consisting of an oligonucleotide, a polypeptide, a protein, an antibody, a peptide, an anticancer agent, a polynucleotide-binding agent, a carbohydrate, a lipid, a cell-surface receptor-binding agent, and mixtures thereof.

2. The coated colloidal material of claim 1, wherein the colloidal material comprises gold or silver.

3. The coated colloidal material of claim 1, wherein the functionalizing agent comprises at least one functional group and a first functional group is selected from the group consisting of a halo, an alkoxy, a carboxylic acid, an ester, a thiol, a selenide, an amine, an amide, a phosphate, a phosphite, a phosphonate, an alkene, an alkyne, a silane, a siloxane, a borane, and mixtures thereof.

4. An organized material comprising a monolayer of the coated colloidal material of claim 1, wherein the coated colloidal material is deposited on the substrate by the Langmuir-Blodgett technique.

5. A method of detecting an analyte in a sample comprising:

contacting the sample with a coated colloidal material of claim 1 under conditions sufficient to permit an interaction of the analyte and the coated colloidal material, and detecting the interaction, wherein the interaction of the analyte and the coated colloidal material produces a detection event.

6. The method of claim 5, wherein the functionalizing agent comprises an oligonucleotide, the analyte comprises a complementary oligonucleotide or a oligonucleotide-binding moiety, and the detection event comprises a change in melting temperature of the oligonucleotide.

7. A coated colloidal material prepared by a method comprising:

admixing a colloidal material, a surface passivating agent, and a coating agent in the presence of an optional catalyst, wherein the colloidal material comprises a nanoprism and the surface passivating agent comprises a thiol, the colloidal material comprising a functionalizing agent on a coating, said coating prepared from the coating agent, wherein the functionalizing agent is selected from the group consisting of decyl(trimethoxy)silane, decyl(triethoxy)silane, dodecyl(triethoxy)silane, hexadecyl(trimethoxy)silane, octadecyl(trimethoxy)silane, and mixtures thereof.

* * * * *